Patented Sept. 5, 1944

2,357,359

UNITED STATES PATENT OFFICE 2,357,359

MINERAL OIL COMPOSITION AND IMPROVING AGENT THEREFOR

Orland M. Reiff and John J. Giammaria, Woodbury, N. J., assignors to Socony-Vacuum Oil Company, Incorporated, New York, N. Y., a corporation of New York No Drawing. Application August 17, 1940, Serial No. 353,070

5 Claims. (Cl. 252—32)

This invention has to do in a general way with mineral oil compositions and is more particularly related to compositions comprised of a mineral oil fraction and a minor proportion of an added ingredient which will improve such oil fraction in one or more important respects.

It is the principal object of this invention to provide addition agents for use in mineral oil fractions, such as those employed as lubricants, which are multifunctional in that a single addition agent will effect improvement in the pour point and the viscosity index and will retard many of the deleterious effects of oxidation, etc., attending the storage and use of the oil. It is a further object of this invention to provide mineral oil compositions the properties of which have been improved by the incorporation therein of one or more of these novel addition agents.

In Patent No. 2,197,837, issued to one of the present joint inventors, Orland M. Reiff, there is disclosed and claimed a class of multifunctional mineral oil addition agents broadly identified as oil - miscible alkyl-substituted hydroxyaromatic carboxylic acids in which the alkyl substituent is attached to the aromatic nucleus and contains at least twenty carbon atoms. The compounds disclosed in that patent may, for purposes of description herein, be designated by the general formula

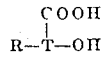

in which T represents an aromatic nucleus, R represents at least one alkyl group of at least twenty carbon atoms, and OH and COOH are attached to the aromatic nucleus T.

The present invention is predicated upon the discovery that the properties of compounds of the type disclosed in the aforesaid patent may be further improved, particularly as to their effectiveness in inhibiting the deleterious effects of oxidation, as, for example, retarding corrosion of alloy bearings, by substituting the hydroxyl hydrogen with an inorganic acid ester group. This substitution or acylation may be effected by reacting an alkyl-substituted hydroxyaromatic carboxylic acid with the halide of a non-metallic or acidic metalloid element. Examples of the halides which may be used in this acylation reaction are the following: POCl₃, PSCl₃, PNCl₂, PCl₃, PCl₅, BCl₃ and SiCl₄. The compound or reaction product obtained by acylating or esterifying the alkylated phenol carboxylic acids of the type disclosed in the aforesaid patent may be broadly characterized as an oil-miscible, substantially stable inorganic acid ester of an alkyl-substituted hydoxyaromatic carboxylic acid. These compounds or reaction products may be represented by the following general formula

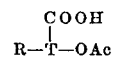

in which R and T have the same significance described above and Ac represents an inorganic acid ester group which may be further defined as having been derived from an inorganic halide selected from the group consisting of POCl₃, PSCl₃, PNCl₂, PCl₃, PCl₅, BCl₃ and SiCl₄.

Compounds of the aforesaid type may be further modified in their properties to condition them for use in particular oils or under particular conditions by substituting the carboxyl hydrogen with a metal. Compounds of this type are contemplated herein as a preferred group in the general class of inorganic acid ester derivatives and may be represented by the general formula

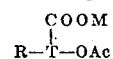

wherein M represents the hydrogen equivalent of a metal and the other symbols have the same significance heretofore defined.

All of the compounds contemplated herein—that is, the inorganic acid esters of alkylated hydroxyaromatic carboxylic acids and the inorganic acid esters of alkylated hydroxyaromatic metal carboxylates—may be represented by the general formula

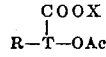

wherein X is selected from the group consisting of hydrogen and a metal.

In the metal carboxylate type of compounds, the selection of a metal will depend to a certain extent upon the character of the oil in which the addition agent is to be added and the conditions under which the oil is to be used. Certain metals such as lead, zinc, and tin, for example, may contribute to the oiliness characteristics of the oil. In general it appears that any metal may be employed as the metal M in carboxylate compounds of the aforesaid type to provide valuable oil addition agents. The metals contemplated herein may be broadly classified as the metals of groups 1 to 8 inclusive of the periodic system capable of forming carboxylate salts. These metals comprise the following: the alkali metals: lithium, sodium, potassium, rubidium, and caesium; the alkaline earth group: beryllium, magnesium, calcium, strontium, and barium; the metals zinc, cadmium, mercury, scandium; the metals aluminum, gallium, indium, thallium, titanium, zirconium, cerium, thorium, germanium, tin and lead; vanadium, columbium, and tantalum; arsenic, antimony, and bismuth; chromium, molybdenum, tungsten and uranium; rhenium, manganese, iron, cobalt and nickel; ruthenium, rhodium and palladium; osmium, iridium and platinum.

Some of the rare earth metals are given in the foregoing. Other rare earth metals suitable for the alkylated acylated hydroxyaromatic carboxylate salt compounds contemplated herein are those now commercially available as the cerium and yttrium group; namely, a mixture of praseodymium, neodymium, samarium, europium, gladolinium, terbium, dysprosium, holmium, erbium, thallium and lutecium.

As aforesaid, the starting materials for obtaining ester compounds of the type contemplated herein are the alkylated hydroxyaromatic carboxylic acids of the type described in Patent No. 2,197,837, to which reference is made herein for a detailed description of ingredients and procedures used in their synthesis as well as details in their chemical composition. In general these alkylated phenolic acids may be obtained by first alkylating a phenol carboxylic compound such as phenol or naphthol (substituted or unsubstituted) in any suitable manner as by a Friedel-Crafts condensation with a halogenated high molecular weight aliphatic hydrocarbon such as chlorinated paraffin wax. As pointed out in the patent, it is desirable in obtaining a product having pour depressant and V. I. improving properties that the alkylated aryl nucleus have at least one alkyl substituent of at least twenty carbon atoms. It is therefore desirable that the aliphatic hydrocarbons, whether a pure compound or mixture of compounds, be predominantly comprised of high molecular weight aliphatic hydrocarbons of at least twenty carbon atoms; and since petroleum wax is a preferred source of such high molecular weight alkyl substituents, the products so alkylated are, as in the aforesaid patent, identified herein as being "wax"-substituted.

Following alkylation, the alkylated phenol is converted to an alkali metal phenate, which is then carboxylated to form the alkylated phenol alkali metal carboxylate. The carboxylate is then acidified with a mineral acid to form the alkylated phenol carboxylic acid. To facilitate handling, the foregoing synthesis is carried out in mineral oil solution so that the ultimate product is a mineral oil solution of the alkylated hydroxyaromatic carboxylic acid.

In the event chlorinated paraffin wax (or a chlorinated aliphatic hydrocarbon of the type which characterizes chlorinated paraffin wax) is used as the alkylating agent, the product obtained is referred to as "wax-substituted." To further identify these "wax-substituted" products we have followed the custom employed in the aforesaid patent of using the parenthetical expression (A—B), indicating with "A" the number of atomic proportions of chlorine in the chlorinated wax reacted with one mole of phenol and indicating with "B" the percentage chlorine content of the chlorinated wax. Thus, wax-phenol carboxylic acid (3—16) indicates that the wax-phenol used in obtaining the acid is the product obtained by reacting one mole of phenol with a quantity of chlorinated wax (of 16 per cent chlorine content) containing 3 atomic proportions of chlorine.

The acylation of the hydroxyl group in the aforesaid hydroxyaromatic carboxylic acid is accomplished by slowly adding the acyl halide of a non-metallic or acidic metalloid element to a mineral oil solution of the alkylated hydroxyaromatic acid at an elevated temperature in the neighborhood of 150° F. After such addition the mixture is heated at a temperature of about 300° F. until the reaction is complete, after which it is cooled to about 150° F., diluted with a suitable solvent such as benzol and water-washed free of mineral acid, after which the solvent is distilled off to obtain the finished acid ester.

In the synthesis of compounds in which the carboxyl hydrogen is substituted with metal, the preferred procedure is to first form the alkali metal carboxylate by reaction of the inorganic acid ester of the alkylated hydroxyaromatic acid with an alkali metal alcoholate. Other desired metals can then be substituted by double decomposition of the alkali metal carboxylate with a normal inorganic or fatty acid salt of the desired metal.

Further details in the procedure which may be followed in synthesizing the inorganic acid ester compounds contemplated herein may be obtained from the following specific examples describing the preparation of the phosphite ester of wax-phenol carboxylic acid (3—16) and the metal carboxylate derivatives thereof.

EXAMPLE 1

*Reaction mixture*

| | Grams |
|---|---|
| Wax-phenol carboxylic acid (3—16) | 50 |
| Mineral oil | 150 |
| $PCl_3$ | 3.34 |

*Procedure*

The $PCl_3$ was added dropwise at 150° F. to the wax-phenol carboxylic acid in a flask equipped with a reflux condenser. When the addition was completed, the temperature was slowly raised to 300° F. and held over a two-hour period to complete the reaction. The mixture was then cooled to about 150° F., diluted with benzol and water-washed free of acid, after which the solvent was distilled off to obtain the finished product, the phosphite ester of wax-phenol carboxylic acid (3—16).

EXAMPLE 2

*Reaction mixture*

| | | |
|---|---|---|
| Phosphite ester of wax-phenol carboxylic acid (3—16) | grams | 50 |
| Mineral oil | do | 150 |
| Metallic sodium | do | 1.68 |
| $CoCl_2$ | do | 4.75 |
| Butyl alcohol | cc | 100 |

*Procedure*

The phosphite ester was dissolved in the butyl alcohol and the sodium added in thin strips. The reaction mixture was then heated about ½ hour at 250° F. to form the sodium salt. A butyl alcohol solution of $CoCl_2$ was slowly added. The temperature was raised to 300° F., and the alcohol was distilled. The mixture was then cooled, diluted with benzol, and filtered. The solvent was distilled to obtain the finished product, the cobaltous carboxylate of phosphite ester of wax-phenol carboxylic acid (3—16).

To demonstrate the improved properties obtained in mineral oil blends containing addition agents of the type discussed herein, we have conducted several comparative tests with representative mineral oils alone and with the same oils blended with these improving agents. The results of these tests are disclosed in the following examples.

POUR POINT DEPRESSANT ACTION

These tests were conducted with a motor oil having a Saybolt viscosity of 67 seconds at 210° F. and a pour point of +20° F. The pour points of blends formed from this oil and representative acylated wax-phenol carboxylic acid and metal carboxylates of the type contemplated herein are listed in Table I below, from which it will be observed that these inorganic acid ester compounds are highly effective pour point depressants.

Table I

| Addition agent | Per cent | A. S. T. M. pour test |
|---|---|---|
| | | °F. |
| Phosphite ester of wax-phenol carboxylic acid (3–16) | ¼ | −25 |
| Cobaltous carboxylate of phosphite ester of wax-phenol carboxylic acid (3–16) | ¼ | −20 |
| Vanadyl carboxylate of phosphite ester of wax-phenol carboxylic acid (3–16) | ¼ | −20 |
| Stannous carboxylate of phosphite ester of wax-phenol carboxylic acid (3–16) | ¼ | −20 |
| Phosphate ester of wax-phenol carboxylic acid (3–16) | ¼ | −20 |
| Cobaltous carboxylate of phosphate ester of wax-phenol carboxylic acid (3–16) | ¼ | −25 |
| Silicate ester of wax-phenol carboxylic acid (3–16) | ¼ | −20 |

VISCOSITY INDEX IMPROVEMENT

The data listed in Table II below showing the effectiveness of the addition agents contemplated herein for improving viscosity index were obtained in the conventional manner from the Saybolt viscosity of the oil and the oil blends at 100° F. and 210° F. The oil used was a viscous mineral oil of the lubricant type.

Table II

| Improving agent | Per cent by wt. | S. U. viscosity | | |
|---|---|---|---|---|
| | | 100° F. | 210° F. | V. I. |
| None | | 140.7 | 41.8 | 79.3 |
| Phosphite ester of wax-phenol carboxylic acid (3–16) | 1 | 152.1 | 42.8 | 87.0 |
| Cobaltous carboxylate of phosphite ester of wax-phenol carboxylic acid (3–16) | 1 | 154.9 | 43.0 | 87.5 |
| Vanadyl carboxylate of phosphite ester of wax-phenol carboxylic acid (3–16) | 1 | 153.7 | 42.9 | 86.9 |
| Phosphate ester of wax-phenol carboxylic acid (3–16) | 1 | 153.7 | 42.9 | 86.1 |
| Cobaltous carboxylate of phosphate ester of wax-phenol carboxylic acid (3–16) | 1 | 153.9 | 43.1 | 91.4 |
| Silicate ester of wax-phenol carboxylic acid (3–16) | 1 | 152.8 | 42.9 | 88.4 |

OPERATION TEST

In addition to the foregoing tests we have also made comparative tests between an oil and an oil blend containing representative improving agents of the type contemplated herein to determine comparative behavior of the unblended oil and the improved oil under actual operating conditions. The tests were carried out in a single cylinder C. F. R. engine operated continuously over a time interval of 28 hours with the cooling medium held at a temperature of about 390° F. and the oil temperature held at a temperature of about 150° F. The engine was operated at a speed of 1200 R. P. M.

The oil used in the test was a lubricating oil stock of 120 seconds Saybolt viscosity at 210° F., and the conditions observed were:

(a) The extent to which the piston rings were stuck;
(b) The extent to which the oil rings were filled with deposit;
(c) The amount of carbonaceous deposit in the oil; and
(d) The neutralization number or acidity (N. N.) of the oil.

The results obtained in these tests are set forth in Table III below, wherein oils $A_1$ and $A_2$ represent the oil alone; oil $B_1$ represents the same oil containing 1 per cent of the phosphite ester of wax-phenol carboxylic acid (3–16) and oil $B_2$ is the same as oil $A_2$ with ½ per cent of the cobaltous carboxylate of phosphate ester of wax-phenol carboxylic acid (3–16).

Table III

| Oil | Ring condition | | | | | | | | Grams carbon Deposit | N. N. | S. U. visc. 210° F. |
|---|---|---|---|---|---|---|---|---|---|---|---|
| | Degrees stuck | | | | | Percent slots filled | | | | | |
| | 1 | 2 | 3 | 4 | 5 | 3 | 4 | 5 | | | |
| $A_1$ | 270 | 360 | 360 | 360 | 360 | 75 | 75 | 75 | 16.5 | 1.7 | 141.6 |
| $B_1$ | 0 | 0 | 0 | 0 | 0 | 10 | 0 | 0 | 5.0 | 1.1 | 131.4 |
| $A_2$ | 180 | 0 | 360 | 180 | 60 | 75 | 75 | 30 | 11.4 | 2.0 | 134.9 |
| $B_2$ | 0 | 0 | 0 | 0 | 0 | 0 | 0 | 0 | 4.0 | 2.9 | 135.0 |

The amount of the improving agent used may be varied, depending upon the mineral oil with which it is blended and the properties desired in the final oil composition. The inorganic acid esters of wax-substituted hydroxyaromatic carboxylic acids may be used in amounts ranging from ¼ per cent to about 10 per cent, and in general compositions of the desired improved properties may be obtained with amounts in the neighborhood of one per cent. We have also disclosed some of the foregoing subject matter in a continuation-in-part, Serial No. 463,966, filed October 30, 1942.

We claim:

1. An improved mineral oil composition comprising a mineral oil having admixed therewith a minor proportion of a phosphite ester of wax-substituted phenol carboxylic acid.

2. An improved mineral oil composition comprising a mineral oil having admixed therewith a minor proportion of a phosphite ester of wax-substituted phenol carboxylic acid in which the carboxylic hydrogen is substituted with metal.

3. An improved mineral oil composition comprising a mineral oil having admixed therewith a minor proportion of the stannous carboxylate of a phosphite ester of wax-phenol carboxylic acid.

4. An improved mineral oil composition comprising a mineral oil having admixed therewith a minor proportion of the cobaltous carboxylate of a phosphite ester of wax-phenol carboxylic acid.

5. An improved mineral oil composition comprising a mineral oil having admixed therewith a minor proportion of the vanadyl carboxylate of a phosphite ester of wax-phenol carboxylic acid.

ORLAND M. REIFF.
JOHN J. GIAMMARIA.

CERTIFICATE OF CORRECTION.

Patent No. 2,357,359.  September 5, 1944.

ORLAND M. REIFF, ET AL.

It is hereby certified that error appears in the printed specification of the above numbered patent requiring correction as follows: Page 2, first column, line 26, for "phenolic" read --phenol carboxylic--; line 27, for "phenol carboxylic" read --phenolic--; page 3, second column, line 55, claim 2, for "carboxylic" read --carboxyl--; and that the said Letters Patent should be read with this correction therein that the same may conform to the record of the case in the Patent Office.

Signed and sealed this 16th day of January, A. D. 1945.

(Seal)

Leslie Frazer
Acting Commissioner of Patents.